(12) United States Patent
Strütt et al.

(10) Patent No.: US 7,113,375 B2
(45) Date of Patent: Sep. 26, 2006

(54) CIRCUIT CONFIGURATION FOR MONITORING AND/OR REGULATING SUPPLY VOLTAGES

(75) Inventors: Bernd Strütt, Steinen (DE); Edwin Steinebrunner, Todtnau (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 430 days.

(21) Appl. No.: 10/398,804

(22) PCT Filed: Oct. 4, 2001

(86) PCT No.: PCT/EP01/11452

§ 371 (c)(1),
(2), (4) Date: Apr. 10, 2003

(87) PCT Pub. No.: WO02/31941

PCT Pub. Date: Apr. 18, 2002

(65) Prior Publication Data

US 2004/0042135 A1    Mar. 4, 2004

(30) Foreign Application Priority Data

Oct. 10, 2000  (DE) ................. 100 49 994

(51) Int. Cl.
*H02H 9/00* (2006.01)
(52) U.S. Cl. .......................... 361/18; 307/44
(58) Field of Classification Search .................. 361/56, 361/18; 307/44, 84, 86
See application file for complete search history.

(56) References Cited

U.S. PATENT DOCUMENTS

| | | | | |
|---|---|---|---|---|
| 4,589,049 A | * | 5/1986 | Krumrein | 361/56 |
| 4,849,845 A | * | 7/1989 | Schmitt | 361/56 |
| 5,694,283 A | * | 12/1997 | Huczko | 361/93.9 |
| 6,040,639 A | * | 3/2000 | Ginell et al. | 307/44 |
| 6,597,592 B1 | * | 7/2003 | Carsten | 363/127 |

FOREIGN PATENT DOCUMENTS

| | | |
|---|---|---|
| DE | 3906621 | 4/1990 |
| DE | 0845848 | 6/1998 |
| GB | 2253956 | 9/1992 |

OTHER PUBLICATIONS

JP 4 8188 A English abstract.

* cited by examiner

*Primary Examiner*—Stephen W. Jackson
*Assistant Examiner*—Boris Benenson
(74) *Attorney, Agent, or Firm*—Bacon & Thomas

(57) ABSTRACT

A circuit configuration for monitoring and/or for regulating supply voltages. The circuit enables at least two supply voltages ($U_{12}$) or ($U_{22}$) that are produced by means of two feed-ins (Q1, Q2) and that are provided for consumer circuits (V1, V2) to be monitored and limited simultaneously. To this end, the circuit configuration comprises a corresponding voltage monitoring electronics unit which detects the supply voltages ($U_{12}$, $U_{22}$) and compares them with associated tolerance values ($\Delta U_{12}$, $\Delta U_{22}$). The voltage monitoring electronics unit also provides a control signal (y) which signals whether the first supply voltage ($U_{12}$) is lower than the associated tolerance value ($\Delta U_{12}$). The control signal (y) is used to control a shunt electronics unit through which a shunt current ($I_S$) passes temporarily. Said shunt current ($I_S$) is fed by feed-in (Q1) and by feed-in (Q2) and passes through the shunt electronics unit at least when the control signal (y) signals that at least the supply voltage ($U_{12}$) is greater than the associated tolerance value ($\Delta U_{12}$).

9 Claims, 3 Drawing Sheets

CIRCUIT CONFIGURATION FOR MONITORING AND/OR REGULATING SUPPLY VOLTAGES

FIELD OF THE INVENTION

The invention relates to a circuit configuration for monitoring and/or regulating and in particular limiting at least two supply voltages for consumer circuits.

BACKGROUND OF THE INVENTION

Electronic consumer circuits, in particular those used is areas at risk of fire and/or explosions, are typically protected by means of voltage limiters from excessive elevations of initially applied voltages, or in other words overvoltages that would increase beyond the voltage level permitted for a given circuit.

Circuit configurations that have at least one semiconductor element, connected in a shunt to the input voltage of a downstream consumer circuit and having a variable ohmic resistor, are often used as voltage limiters.

For instance, in U.S. Pat. Nos. 4,589,049 and 4,849,845, circuit configurations for monitoring and/or regulating, in particular limiting, a supply voltage for a downstream consumer circuit are described that include the following:

a voltage monitoring electronics unit, reacting the supply voltage, for generating a control signal that signals whether the supply voltage is lower than an associated tolerance value;

a shunt electronics unit, triggered by the control signal, with at least one semiconductor element for regulating and guiding a shunt current driven by the supply voltage, and the supply voltage drops at least in part via the shunt electronics unit, and the shunt current flows through the shunt electronics unit at least whenever the control signal signals that the supply voltage is greater than the tolerance value.

When such circuit configurations, serving as active voltage limiters, are used for electronic consumer circuits that are used in areas at risk of fire and/or explosion, particular in circuits that are intended to meet European standards EN 50019 and/or EN 50020, at least the voltage-limiting shunts are made redundant, for instance by means of multiple cascading, in terms of current-carrying capacity and/or voltage strength, because of the required enhanced or intrinsic safety.

This in turn necessarily means increased expense for components and/or wiring, and typically this also means an increased demand for space for such voltage limiters.

SUMMARY OF THE INVENTION

It is therefore an object of the invention to reduce the expense for circuitry for a voltage limiter of this kind, and especially the expense for circuitry for the voltage-limiting shunt.

For attaining this object, the invention comprises a circuit configuration for monitoring and/or regulating at least one first supply voltage, generated by means of a first feed-in, for a first consumer circuit connected to a first output of the circuit configuration, and at least one second supply voltage, generated by means of a second feed-in, for a second consumer circuit connected to a second output of the circuit configuration, which circuit configuration includes:

a voltage monitoring electronics unit, reacting to at least the first supply voltage, for generating a control signal that signals whether the first supply voltage is lower than an associated first tolerance value; and a shunt electronics unit, through which a shunt current flows at least intermittently;

wherein the shunt current
is supplied by the first and the second feed-in, and
flows through the shunt electronics unit at least whenever the control signal signals that at least the first supply voltage is greater than the first tolerance value.

The invention is based on the inventors' discovery that in an electronic circuit with multiple feeds by means of such lines, such as a circuit connected to a data bus, if a fault and in particular an overvoltage occurs on even only one of the bus lines, the entire circuit must often be rendered voltageless, for instance by shutting it off or by lowering the voltages supplying the circuit, since continued operation of circuit components that are not connected to the faulty bus lines is either unnecessary or not allowed.

It is a fundamental concept of the invention, whenever an overvoltage is detectable on at least one of a plurality of voltage-carrying lines, to pull these lines simultaneously to a lower potential, such as a ground potential of the circuits furnishing the applicable voltage, and thus to render downstream circuits practically voltageless, by means of a single circuit configuration that is in a shunt, i.e. a parallel circuit, to each of these lines.

One advantage of the circuit configurations of the invention is that by their use at the entrance to an electronic circuit, especially one of intrinsic and/or enhanced safety, the expense for components for realizing the voltage-limiting shunts can be reduced considerably. It has in fact been found that the power consumption capability of the semiconductor elements that carry the shunt current, and in particular their current-carrying capacity, that is required to achieve the necessary safety can be designed to be considerably less than what would result in a version with separately embodied shunts for each line and additionally with the then-necessary power consumption capability of each individual semiconductor element. Another reason why this is true is that in the circuit configurations of the invention, the semiconductor element or elements can be cooled more effectively compared to the other version. Moreover, to achieve the shunt electronics unit, even without higher-precision semiconductor elements, for instance, which typically have a higher individual price, can be used without increasing the total cost of the circuit configuration.

BRIEF DESCRIPTION OF THE DRAWINGS

The invention and further advantages will be described in further detail below in conjunction with exemplary embodiments that are shown in the drawings; in the drawings, identical elements are identified by the same reference numerals. If it is helpful for the sake of simplicity, reference numerals already assigned are omitted from subsequent drawing figures.

DESCRIPTION OF THE PREFERRED EMBODIMENTS

In a first preferred feature of the invention, the voltage monitoring electronics unit also reacts to the at least second supply voltage; and the control signal signals whether the second supply voltage is lower than an associated second tolerance value.

In a second preferred feature of the invention, the shunt electronics unit includes at least one controllable semiconductor element.

In a third preferred feature of the invention, a conductivity of the semiconductor element is regulated by means of the control signal.

In a fourth preferred feature of the invention, the circuit configuration includes means for keeping potentials of the first and second supply voltages separate.

In a fifth preferred feature of the invention, the first feed-in furnishes a first terminal voltage for regulating the first supply voltage, and reacts to an increase in the shunt current by lowering the first terminal voltage.

In a sixth preferred feature of the invention, the control signal signals the extent to which the first supply voltage is higher than the first tolerance value.

In a seventh preferred feature of the invention, at least the first consumer circuit is of intrinsic and/or enhanced safety.

Figure 1:
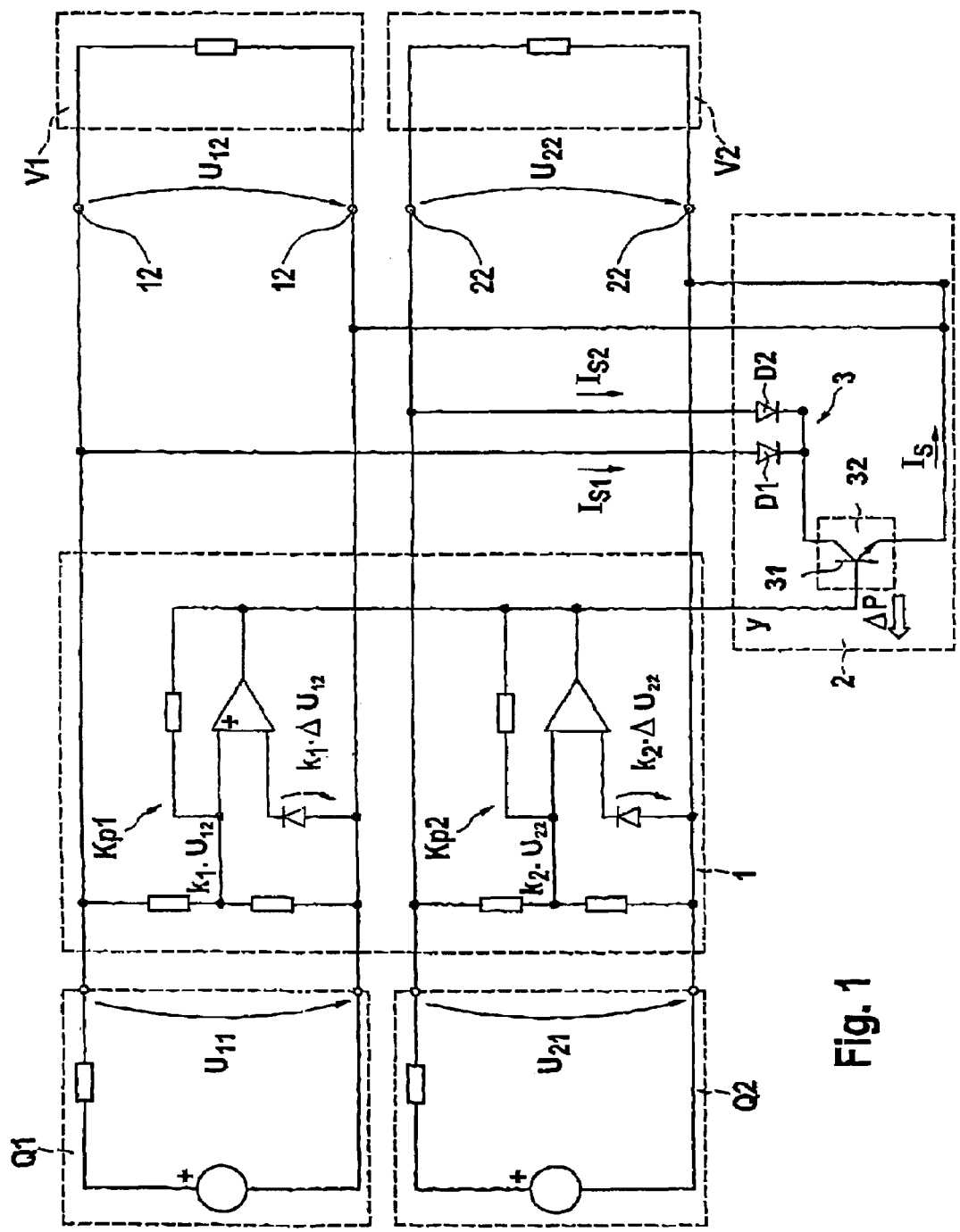
FIG. 1 shows one exemplary embodiment of a circuit configuration for limiting voltages.
Figure 2:
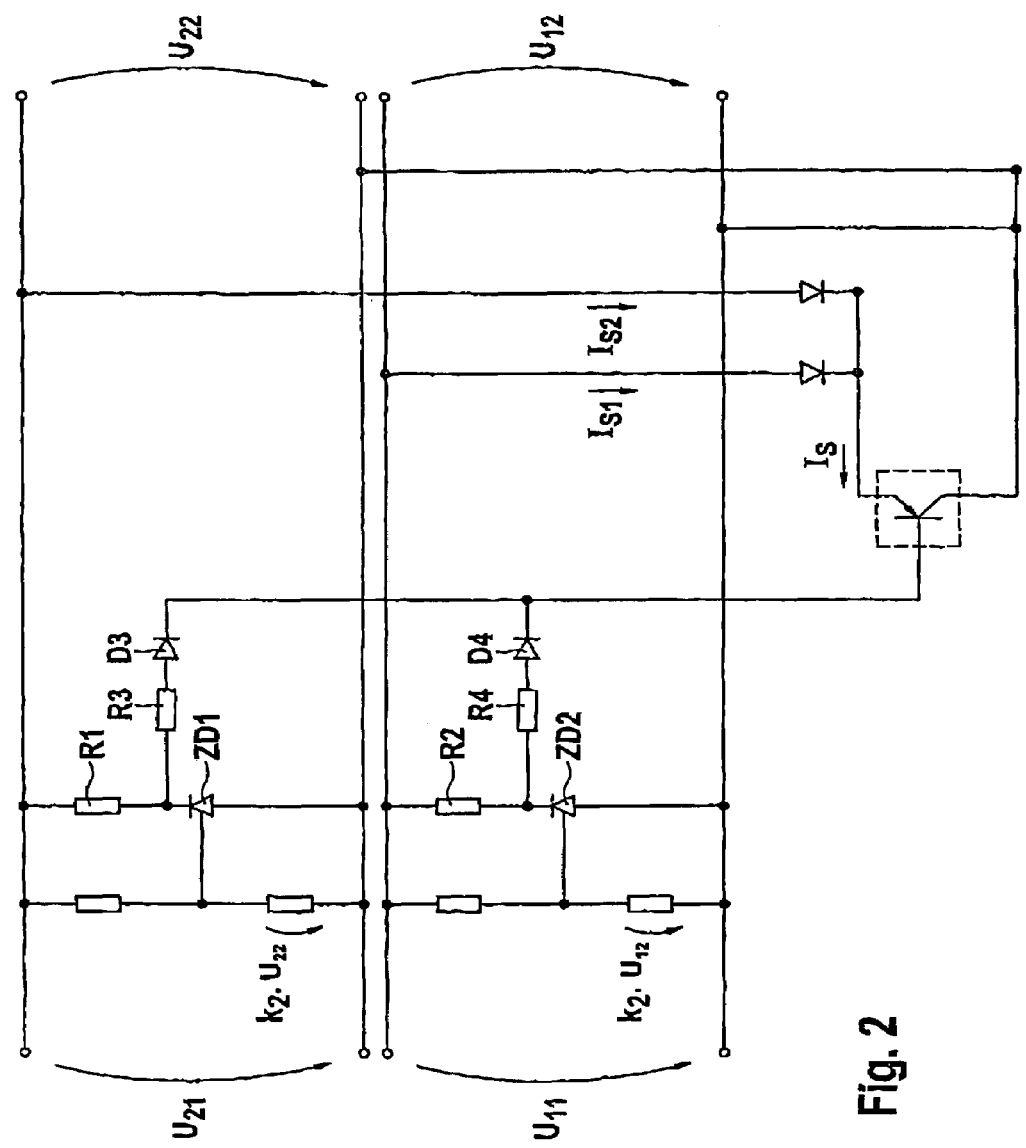
FIG. 2 shows another exemplary embodiment of a circuit configuration for limiting voltages.

FIGS. 1 and 2 each schematically show one exemplary embodiment for a circuit configuration that serves in operation to monitor a first supply voltage $U_{12}$ for a first consumer circuit V1, connected to a first output 11, and a second supply voltage $U_{22}$ for a second consumer circuit V2, connected to a second output 21. The consumer circuits V1, V2 can for instance be transmitter circuits of field devices with enhanced or intrinsic safety.

The supply voltages $U_{12}$, $U_{22}$ are preferably direct voltages and are furnished by a first feed-in Q1 and a second feed-in Q2, respectively, and in the exemplary embodiments of FIGS. 1 and 2 they are practically equal to a first terminal voltage $U_{11}$ and second terminal voltage $U_{12}$ that can be picked up at the output of the feed-in Q1 and Q2, respectively. However, the terminal voltages $U_{11}$, $U_{21}$ and the corresponding supply voltages $U_{12}$, $U_{22}$ can differ from one another, for instance because of longitudinal voltage instances along connecting lines that extend between the feed-ins Q1, Q2 and the respective associated consumer circuits V1 and V2.

Both terminal voltages $U_{11}$, $U_{21}$ can have not only a respective rated voltage component but also an error voltage component, in particular an overvoltage. Thus the two supply voltages $U_{12}$, $U_{22}$ are also composed both of a voltage component assumed to be constant and a voltage component assumed to be variable, in particular one that appears only temporarily, namely a rated voltage $U_{n12}$ and an error voltage $U_{f12}$ for the supply voltage $U_{12}$, and a rated voltage $U_{n22}$ and an error voltage $U_{f22}$ for the supply voltage $U_{22}$. Accordingly, for the supply voltages $U_{12}$, $U_{22}$, the following equations can apply, respectively:

$$U_{12} \leq U_{n12} + U_{f12}, \text{ and}$$

$$U_{22} \leq U_{n22} + U_{f22}. \tag{1}$$

For monitoring the supply voltages $U_{12}$, $U_{22}$, the circuit configuration of FIG. 1 has a corresponding voltage monitoring electronics unit 1, which in operation detects the supply voltages $U_{12}$, $U_{22}$ and replicates them in a control signal y, such as a binary or analog signal voltage, which signals whether the supply voltage $U_{12}$ is lower than a tolerance value $\Delta U_{12}$ associated with it, and whether the supply voltage $U_{22}$ is lower than a tolerance value $\Delta U_{22}$ associated with it, or whether at least one of the supply voltages $U_{12}$, $U_{22}$ is higher than the respective associated tolerance value $\Delta U_{12}$ and $\Delta U_{22}$.

The tolerance value $\Delta U_{12}$ is regulated such that it is greater than or equal to a highest expected voltage level $\text{Max}\{U_{12}(U_{f12}=0)\}$ of the supply voltage $U_{12}$ without interference, at which the error voltage $U_{f12}$ is equal to zero. The tolerance value $\Delta U_{12}$ is also regulated such that it is less than a least voltage level $\text{Min}\{U_{12}(U_{f12}>0)\}$ the supply voltage $U_{12}$ with interference, at which the error voltage $U_{f12}$ is greater than zero; the tolerance value $\Delta U_{22}$ should be regulated analogously relative to the supply voltage $U_{22}$. For the tolerance values $\Delta U_{12}$, $\Delta U_{22}$, the following equations thus respectively apply:

$$\text{Max}\{U_{12}(U_{f12}=0)\} \leq \Delta U_{12} < \text{Min}\{U_{12}(U_{f12}>0)\}, \text{ and}$$

$$\text{Max}\{U_{22}(U_{f22}=0)\} \leq \Delta U_{22} < \text{Min}\{U_{22}(U_{f22}>0)\}. \tag{2}$$

Besides detecting the supply voltages $U_{12}$, $U_{22}$, the circuit configuration also serves to limit the supply voltages $U_{12}$, $U_{22}$ in their voltage level, specifically such that they do not exceed the respective associated tolerance value $\Delta U_{12}$ and $\Delta U_{22}$, or at most exceed it for no longer than approximately 100 ns.

For regulating the supply voltages $U_{12}$, $U_{22}$, the circuit configuration furthermore includes a shunt electronics unit 2, with at least one semiconductor element that is adjustable in its conductivity and that when triggered by the control signal y in operation varies this conductivity.

The shunt electronics unit 2, together with the consumer circuits V1, V2 downstream of the circuit configuration, functions as an adjustable current divider, comprising a variable output resistor for the circuit configuration and an input resistor for the consumer circuit V1, and an input resistor for the consumer circuit V2. By means of the shunt electronics unit 2, the supply voltages $U_{12}$, $U_{22}$ dropping across it are limited in their level or are lowered again, in particular for an error situation in which at least one of the supply voltages $U_{12}$, $U_{22}$ is greater than the associated tolerance value $\Delta U_{12}$ or $\Delta U_{22}$.

Moreover, the shunt electronics unit 2 at least intermittently, and in particular in the above-described error situation, experiences a flow through it of a shunt current Is of the circuit configuration. As shown in FIG. 1, the shunt current $I_S$ is equivalent to a total current that is formed by means of a first partial current $I_{S1}$, driven by the supply voltage $U_{12}$, and a second partial current $I_{S2}$ driven by the supply voltage $U_{22}$. The shunt current $I_S$ in particular also serves to increase the current demand at the first and/or second feed-in Q1, Q2, and thus at least briefly to lower the supply voltage $U_{12}$ and the supply voltage $U_{22}$, respectively.

The shunt electronics unit 2, as shown in FIG. 1, includes at least one controllable semiconductor element 31, located in shunt with the outputs 11, 21, and the control signal y is applied to the semiconductor element at a corresponding control electrode. A bipolar transistor or a field effect transistor can for instance serve as the semiconductor element 31. If necessary, the single semiconductor element 31 can also be replaced with a corresponding Darlington circuit of a plurality of transistors, to improve the response performance of the shunt electronics unit 2 to the control signal y.

To increase its current-carrying capacity, the shunt electronics unit 2 can moreover be provided with a corresponding cooling assembly 32, such as a cooling baffle at the semiconductor element 31, by way of which a considerable proportion ΔP of the power picked up by the semiconductor element 2, whose level can be estimated for instance using the relationship $U_{12} \cdot I_{S1} + U_{22} \cdot I_{S2}$, can be dissipated to the environment. Moreover, the power consumption capability can also be increased by providing that the shunt electronics unit 2, instead of a single transistor, has a parallel circuit of two or more transistors, especially of the same type.

As shown in FIG. 1, the circuit configuration furthermore includes means 3 for keeping potentials separate, which means serve to keep at least one potential of the supply voltage $U_{12}$ separate from at least one potential of the supply voltage $U_{22}$.

The means 3 for keeping potentials separate, in the exemplary embodiment of FIG. 1, include a first diode D1 for the supply voltage $U_{12}$, which carries the at least intermittently flowing partial current $I_{S1}$, and a second diode D2 for the supply voltage $U_{22}$, carrying the at least intermittently flowing partial current $I_{S2}$. As FIG. 1 shows, a potential of the supply voltage $U_{12}$ is applied to the diode D1 via a first electrode, and a potential of the supply voltage $U_{22}$ is applied to the diode D2 via its first electrode, while the diodes D1, D2 are connected to one another each via their respective second electrodes. The diodes D1, D2 are connected such that in the error situation described above, they experience a flow in the conducting direction of the partial current $I_{S1}$ and $I_{S2}$, respectively; however, a charge compensation between the two potentials of the supply voltages $U_{12}$, $U_{22}$ that are supposed to be kept separate from one another is practically always prevented. If necessary, instead of a single diode D1 or D2, a respective series circuit and/or parallel circuit, functioning in the same way, of two or more diodes can be used to separate the potentials.

In a preferred feature of the invention, the voltage monitoring electronics unit 1, as shown in FIG. 1, is realized by means of a first comparator Kp1 for the supply voltage $U_{12}$ and a second comparator Kp2 for the supply voltage $U_{22}$; the comparators Kp1, Kp2 are connected to one another on the output side. For detecting the supply voltages $U_{12}$, $U_{22}$, partial voltages $k_1 \cdot U_{12}$ and $k_2 \cdot U_{22}$ proportional to terminal voltages $U_{11}$ and $U_{22}$, respectively, which are in this embodiment also proportional to supply voltages $U_{12}$ and $U_{23}$, respectively are applied respectively to noninverting inputs of one operational amplifier of each of the comparators Kp1, Kp2. A reference voltage $k_1 \cdot \Delta U_{12}$ and $k_2 \cdot \Delta U_{22}$ that is proportional to the corresponding tolerance value $\Delta U_{12}$ or $\Delta U_{22}$ is also applied to their respective inverting input of these operational amplifiers.

Since the two comparators Kp1, Kp2 are connected to one another on the output side, the voltage monitoring electronics unit 1 furnishes a signal voltage, which serves as a binary control signal y and corresponds to a logical-disjunctive linkage of the likewise binary output voltages of the two comparators Kp1, Kp2. Accordingly, the control signal y assumes a high level for a logical "1" when the output voltage of the first and/or comparator Kp1, Kp2 also has a high level, or in other words if the supply voltage $U_{12}$ is higher than the tolerance value $\Delta U_{12}$, and/or if the supply voltage $U_{22}$ is higher than the tolerance value $\Delta U_{22}$; if not, the control signal y has a low level for logical "0".

In this feature of the invention, the shunt electronics unit 2 in shunt with the outputs 12, 22 preferably has an npn bipolar transistor, acting as a controllable semiconductor element 21, to which the control signal y is supplied in the form of a base-to-emitter voltage.

If necessary, instead of the comparators Kp1, Kp2, amplifier circuits can be used, of the kind that in contrast to binary output voltages generate analog output voltages, for instance, so that the voltage monitoring electronics unit 1 correspondingly furnishes a likewise analog control signal y. Such amplifier circuits can be configured in a way that is familiar to one skilled in the art, for instance as proportional amplifiers, or as differentiators that detect the error voltages by way of changes in the supply voltages $U_{12}$, $U_{22}$. In the latter case, the tolerance values $\Delta U_{12}$, $\Delta U_{22}$ would accordingly represent a reference for changes in voltage over time.

In a further preferred feature of the invention, the voltage monitoring electronics unit 1, for detecting the supply voltages $U_{12}$, $U_{22}$, has a first voltage divider, which is adjustable in operation, for the supply voltage $U_{12}$ and a second voltage divider, also adjustable in operation, for the supply voltage $U_{22}$. For that purpose, as shown in FIG. 2, a partial voltage $k_1 \cdot U_{12}$ proportional to the supply voltage $U_{12}$ is applied to a reference electrode of an adjustable Zener diode ZD1 of the first voltage divider, and a partial voltage $k_2 \cdot U_{22}$ proportional to the supply voltage $U_{22}$ is applied to a reference electrode of an adjustable Zener diode ZD2 of the second voltage divider.

By way of example, adjustable precision Zener diodes made by ZETEX of Type ZR431 can be used as the adjustable Zener diodes ZD1, ZD2.

The Zener diode ZD1 is preferably applied, by means of its cathodes and via a first current limiting resistor R1, to a potential of the supply voltage $U_{12}$; analogously, as shown in FIG. 2, the Zener diode ZD2 can be carried, by means of a second current limiting resistor R2, to a potential of the supply voltage $U_{22}$. The Zener diodes ZD1, ZD2 are also connected on the cathode side to a third and fourth current limiting resistor R3, R4, respectively. Moreover, the means 3 for keeping potentials separate, in the exemplary embodiment of FIG. 2, include a third diode D3, connected to the current limiting resistor R3 on the anode side, and a fourth diode D4, connected to the current limiting resistor R4 on the anode side. Both the current limiting resistors R3, R4 and the current limiting resistors R1, R2 can be selected such that are within a range of 10 kΩ to 100 kΩ, for instance. However, if necessary, either one of the two or both current limiting resistors R1, R2 can be designed as much larger or can be omitted entirely.

The two diodes D3, D4 are furthermore connected via their respective cathodes to the control electrode of the shunt electronics unit 2. This shunt electronics unit preferably has a pnp bipolar transistor in shunt with the outputs 12, 22. If the supply voltages $U_{12}$, $U_{22}$ differ from one another only slightly, however, it is optionally possible to dispense with their decoupling by means of the two diodes D3, D4 entirely, so that the Zener diodes ZD1, ZD2 are coupled practically directly, via the current limiting resistor R3 and R4, respectively, to the control electrode of the shunt electronics unit 2.

In operation of the circuit configuration, voltage drops that are inversely proportional to the partial voltages $k_1 \cdot U_{12}$ and $k_2 \cdot U_{22}$, respectively, can be picked up via the Zener diodes ZD1, ZD2. These voltage drops, because of the common connection of the Zener diodes ZD1, ZD2 to the control electrode of the shunt electronics unit 2, are in turn disjunctively linked to one another, so that at the control electrode, a signal voltage acting as an analog control signal y which is lower, the higher the supply voltages $U_{12}$ and/or $U_{22}$ are, is established or regulated; in other words, this control signal can serve to signal the extent to which the supply voltage $U_{12}$ is higher than the tolerance value $\Delta U_{12}$ and/or the extent to which the supply voltage $U_{22}$ is higher than the tolerance value $\Delta U_{22}$.

In the event that at most the supply voltages $U_{12}$, $U_{22}$ are regulated to be equal to the associated tolerance values $\Delta U_{12}$ and $\Delta U_{22}$, or in other words for a normal operating situation, a control current flowing through a diode ZD1 or ZD2 can amount to a few microamperes, for instance being in the range from 10 μA to 100 μA; for the error or fault situation described above, by comparison, the control current can amount to as high as 100 mA.

This feature of the invention has the particular advantage that because of the quasi-continuously flowing control current acting as a control signal y, it is possible even at low error voltages $U_{f12}$, $U_{f22}$ to achieve a counteraction in which the terminal voltages $U_{11}$ and $U_{21}$ that drive the error voltages $U_{f12}$, $U_{f22}$, because of the typically limited power of the feed-ins Q1, Q2, are lowered at least in part again practically without delay.

This feature of the invention has the further advantage that in the error situation, the control signal y and thus also the shunt current $I_S$ can increase slowly and continuously, thus making it possible to suppress or avoid and induction of further overvoltages.

Figure 3:
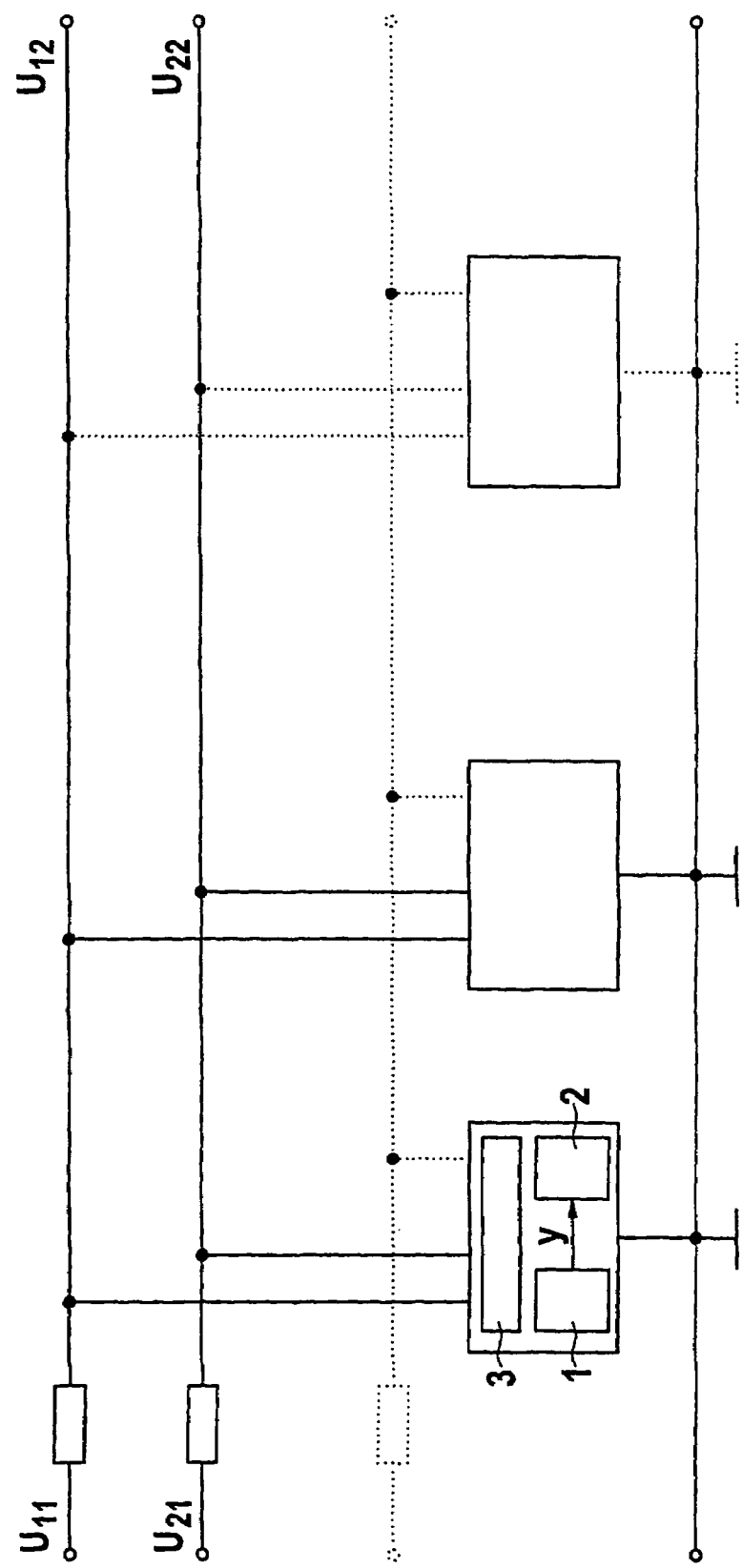
FIG. 3 shows one example of a cascaded combination of a plurality of circuit configurations for limiting voltages.

To increase the redundance of the voltage limitation, it is also possible, as shown schematically in FIG. 3, to connect a plurality of such circuit configurations in series in cascade. It is also possible, parallel to the two supply voltages $U_{12}$, $U_{22}$, as schematically represented by the components drawn in dotted lines, it is also possible for still other such supply voltages to be monitored and correspondingly jointly limited by means of a circuit configuration of this kind.

What is claimed is:

1. A circuit configuration for monitoring and/or regulating at least one first supply voltage ($U_{12}$), generated by means of a first feed-in (Q1), for a first consumer circuit (V1) connected to a first output of the circuit configuration, and at least one second supply voltage ($U_{22}$), generated by means of a second feed-in (Q2), for a second consumer circuit (V2) connected to a second output of the circuit configuration, which circuit configuration includes:
   a voltage monitoring electronics unit, reacting to at least the first supply voltage ($U_{12}$), for generating a control signal (y) that signals whether the first supply voltage ($U_{12}$) is lower than an associated first tolerance value ($\Delta U_{12}$); and
   a shunt electronics unit, through which a shunt current ($I_S$) flows at least intermittently;
   wherein the shunt current ($I_S$) is supplied by the first and the second feed-in (Q1, Q2), and
      flows through the shunt electronics unit at least whenever the control signal (y) signals that at least the first supply voltage ($U_{12}$) is greater than the first tolerance value ($\Delta U_{12}$).

2. The circuit configuration of claim 1,
   in which the voltage monitoring electronics unit also reacts to the at least second supply voltage ($U_{22}$); and
   in which the control signal (y) signals whether the second supply voltage ($U_{22}$) is lower than an associated second tolerance value ($\Delta U_{22}$).

3. The circuit configuration of claim 1, in which the shunt electronics unit includes at least one controllable semiconductor element.

4. The circuit configuration of claim 3, in which a conductivity of the semiconductor element is regulated by means of the control signal (y).

5. The circuit configuration of claim 1, which includes means for keeping potentials of the first and second supply voltages ($U_{12}$, $U_{22}$) separate.

6. The circuit configuration of claim 1, in which the first feed-in (Q1)
   furnishes a first terminal voltage ($U_{11}$) for regulating the first supply voltage ($U_{12}$), and
   reacts to an increase in the shunt current ($I_S$) by lowering the first terminal voltage ($U_{11}$).

7. The circuit configuration of claim 1, in which the control signal (y) signals the extent to which the first supply voltage ($U_{12}$) is higher than the first tolerance value ($\Delta U_{12}$).

8. The circuit configuration of claim 1, in which at least the first consumer circuit (V1) is of intrinsic and/or enhanced safety.

9. A method for monitoring and/or regulating at least one first supply voltage, generated by means of a first feed-in, for a first consumer, and at least one second supply voltage, generated by means of a second feed-in, for a second consumer circuit, the method comprising the steps of:
   generating at least one control signal that signals whether at least one of said first and second supply voltages is lower than an associated first and second tolerance value, respectively; and
   flowing, at least intermittently, a shunt current through a shunt electronics unit at least whenever the control signal signals that at least one of said first and second voltages is greater than the respective tolerance value; wherein
   the shunt current is supplied by means of the first and second feed-in.

* * * * *